Patented Dec. 19, 1933

1,940,431

UNITED STATES PATENT OFFICE 1,940,431

AQUEOUS DISPERSION OF MONTAN WAX AND OTHER WATER-IMMISCIBLE BODIES AND PROCESS OF MAKING

Oscar F. Neitzke, Cambridge, Mass., assignor to Bennett, Incorporated, East Cambridge, Mass., a corporation of Massachusetts No Drawing. Application December 7, 1929
Serial No. 412,580

9 Claims. (Cl. 134—1)

This invention relates to the production of aqueous dispersions of Montan wax and other water-immiscible bodies. While not limited thereto, this invention deals more specifically with the dispersion in water of Montan wax and those water-immiscible bodies which are "thermoplastic hydrocarbons," by which expression is meant the asphalts, the paraffins, and analogous chemically inactive bodies which are solid under usual atmospheric temperature conditions, but are capable of being melted substantially without decomposition under the application of heat.

An object of the present invention is the production of stable aqueous dispersions of Montan wax and thermoplastic hydrocarbon bodies of high dispersed solids content and of uniformly fine particle size. Another object is to produce dispersions of this character having the capacity of being readily diluted with water to an extremely low solids content without substantial agglomeration and coalescence of the dispersed particles or separation thereof from the aqueous medium. I have discovered that it is possible to produce dispersions of Montan wax and thermoplastic hydrocarbons having the desired characteristics, by the use of dilute solutions of alkali, for instance, caustic soda solutions up to about 2% strength, or solutions of other alkalies such as caustic potash, sodium carbonate, and ammonia of corresponding normality. When solutions of caustic soda of, say, about 1% or lower strengths are used, the resulting dispersions are free-flowing, even when they sometimes contain as high as 50% dispersed solids and are capable of being greatly diluted with water, for instance, to a solids content of about 2% or less, without noteworthy agglomeration and coalescence of the dispersed particles. The use of dilute solutions of alkali in producing the desired dispersions is an essential feature of my invention, for if it be attempted to produce such concentrated dispersions with solutions of caustic soda much above 2% strength, the resulting product is a semi-solid which cannot readily be diluted with water, but from which part of the water phase may be squeezed by applying moderate hand pressure thereto. Evidently the water is present therein in the form of water of hydration of some kind,—analogous, for example, to the water of hydration of some crystallized salts or the water of absorption of colloids such as glue.

My discovery may be advantageously applied to the preparation of commercially valuable dispersions of mixtures of Montan wax and thermoplastic hydrocarbon bodies such as asphalt and/or paraffin, but in such case, too, it is necessary to use dilute solutions of alkali to produce concentrated, free-flowing, aqueous dispersions of high stability and capable of being diluted to any desired consistency by the mere addition of water thereto.

In preparing the aqueous dispersions of the present invention, the Montan wax alone or a mixture of the Montan wax with asphalt and/or paraffin is heated to above its melting point, and a dilute solution of alkali in heated condition is added thereto and mixed therewith. The mixing of the molten material and the solution of alkali may be effected in batches, or each of these materials may be withdrawn at the desired rate from independent batches, as continuously flowing streams, and the streams united and intimately mixed. The solution of alkali is preferably at a temperature sufficiently high so that when mixed with the molten thermoplastic material, the resultant temperature will be higher than that necessary to maintain the thermoplastic material molten, as under such conditions it is possible to effect a dispersion of the molten mass into uniformly fine particles without premature congealing of the molten material. It is possible, however, to arrive at the same results by heating the thermoplastic material and the solution together to temperatures above the melting point of the material and then effecting an intimate mixture.

In producing dispersions of paraffin, it is preferable to chill the dispersion immediately after its formation and while the dispersed particles of paraffin are in molten condition, since if such a dispersion is permitted to cool slowly, the fine particles of paraffin tend to agglomerate or coalesce while in the liquid state. The desired chilling effect may be obtained by carrying out the mixing and dispersing operation in apparatus provided with a jacket through which cold water or other cooling medium may be passed to congeal rapidly the fine particles of molten paraffin before they have opportunity to agglomerate and coalesce.

In accounting for the surprising results which I secure, one must look to the composition of the Montan wax and ascertain what chemical action may take place beween the wax and a solution of alkali under various conditions. This wax, as well known, varies more or less, depending upon its origin and method of extraction, but all varieties consist generally of a mixture of fatty acids known as crude montanic acid and unsaponifiable constituents which are supposed to be saturated hydrocarbons. The crude montanic acid is said to comprise, in the main, pure montanic acid having the formula $C_{28}H_{36}O_2$, and a smaller amount of fatty acid of lower molecular weight. A dilute solution of alkali reacts upon and saponifies the more readily saponifiable content of the Montan wax—probably the fatty acids of lower molecular weight—to produce soaps of high stability and hence capable of stabilizing the resulting dispersion even when present in traces, as when the dispersion is diluted with water. Only a portion of the alkali of the dilute solution is consumed in saponifying the more readily saponifiable portion of the Montan wax, as the more difficultly saponifiable portion is saponified only by prolonged cooking with concentrated solutions of alkali. When concentrated solutions of alkali are employed without prolonged cooking and in amount to produce a product of high solids content, the product is of exceedingly high residual alkalinity, and this highly alkaline condition evidently favors some kind of hydration or crystallization of the soap constituents, much in the same way that the presence of caustic soda in sodium silicate solutions under certain conditions favors crystallization into silicates having water of crystallization, whereas neutral silicate solutions have no crystallizing tendencies.

It is easier to disperse crude Montan wax than refined Montan wax. The explanation for this, aside from the fact that the crude Montan wax contains traces of material which may have the function of protective colloids, seems to lie in its much larger content of material having hydroxyl groups, which may react in part with the dilute solution of alkali to form stable soaps. Thus, the ester number, which is a measure of hydroxyl groups, may be 35 in the case of a crude Montan wax and only 2 in the case of a refined Montan wax of similar origin, these being the values of the well-known "Riebeck" variety. In the case of both crude and refined Montan wax, however, stable soaps or other saponification products are formed with the more readily saponifiable constituents, these products serving as the stabilizers or protective colloids in the resulting dispersions.

There are important advantages which are realized by using Montan wax as a constituent in forming dispersions of asphalt and/or paraffin. Not only is it possible to produce dispersions of the desired characteristics, but their production involves the expenditure of little energy and the use of exceedingly small amounts of alkali, as very little soap need be produced. The resulting dispersion, being of high solids content, may be stored or shipped with low water content and may then be readily diluted to the consistency desired for use.

I shall now give specific examples of procedure according to which dispersions such as described may be produced and illustrative uses to which they may be put. In the case of Montan wax-asphalt dispersions, it is desirable from a cost standpoint to use as little Montan wax as possible, since even the crude Montan wax is much more expensive than most types of asphalt. I have found that as little as about 10% to 15% of crude Montan wax need be used to furnish sufficient protective colloid in the product. Assuming that the asphalt is air-blown and has a melting point of 150° F. (ball and ring test) and the crude Montan wax has a melting point of 175° F., the mixture is melted and heated to about 300° F., at which temperature it flows readily. To approximately 35 parts of the molten mixture is added approximately 65 parts of a ¾% solution of caustic soda at a temperature of 150° F. The melted mixture and solution are preferably maintained under rapid agitation as they are mixed, so as to effect a rapid and uniform dissemination of the solution throughout the mass and thus to promote uniform chemical reaction and dispersion. Inasmuch as the specific heat of the molten mixture is much less than that of water, little, if any, liberation of steam takes place at the final temperature produced, which is above the melting point of the thermoplastic materials but below the boiling point of water. The resulting dispersion is of a creamy consistency, so that water may be added and readily distributed therethrough in large quantities. It is composed of uniformly fine particles in the order of magnitude of 1/5000 to 1/10000 of an inch in diameter and is characterized by its stability even at as low as 1% solids content. Such a dispersion is suitable for use as a paint, at a solids content of about 30%, under which conditions it has remarkably good covering power and is comparable in this respect to the so-called asphalt paints prepared by "dissolving" asphalts in organic solvents. Such paints may be applied with the usual paint brushes and may set under usual room temperature conditions, say, 70° F., as continuous films in about an hour. The dispersion is suitable for use in the impregnation of felts, papers, yarns, textile fabrics, and the like, to render them waterproof. It is an excellent size for paper pulp intended more especially for the production of waterproof papers, as the resulting papers are free from the unsightly asphalt specks appearing when the usual asphalt dispersions are employed. Evidently the usual asphalt dispersions when added to a dilute aqueous pulp suspension undergo premature precipitation of a kind in which the fine particles of asphalt unite into particles of microscopic size, whereas in the case of the product of the present invention no such premature reaction takes place. The dispersed particles may, however, be fixed on the fibers by the use of paper-makers' alum or other suitable salts or acids, in which case a loose precipitate, quite different from that incident to dilution of some dispersions with water is produced.

A papermaking procedure designed for the production of a mulch paper using the asphalt dispersion product of the present invention may be practised substantially as follows. A suitable stock, such as kraft pulp, may be beaten out to the desired degree of hydration, say, from one to four hours, whereupon the desired amount of Montan wax-asphalt dispersion may be added thereto, say from 10% to 20%, based on the weight of dry pulp. After the dispersion has been uniformly disseminated throughout the pulp, about 4% to 6% alum, based on the weight of dry pulp, may be added to effect a fixation of the dispersed particles on the fibers. When the sized pulp is then run out on a paper machine, the white water removed during papermaking operations is substantially clear, showing that substantially all the size has been retained by the fibers. Moreover, because of the fine particle size, no gumming of the wires or felts is encountered during the papermaking operation.

The resulting paper is admirably adapted for use as a mulch, being highly waterproof because of the uniform distribution of waterproofing material therethrough. Rather than having a black color, the paper has a tan shade, which indicates that the asphalt has been distributed therethrough as very fine particles and has blended with the color of the fiber.

In preparing dispersions of Montan wax and paraffin, a mixture consisting of 15% or more of crude Montan wax may be employed. The mixture is melted and heated to a temperature of about 220° F., which temperature is materially above the melting point of the paraffin (130° F.). To about 50 parts of the Montan-paraffin wax mixture may be added with vigorous agitation 50 parts of a solution of caustic soda of ¼% to ½% strength and at 95° to 100° F. The resulting dispersion is of a creamy consistency and is sufficiently fluid to be sucked up with a pipette. The final dispersion, in a case when a ½% caustic solution is used, may contain as high as 50% of the alkali originally used in free condition. Preferably the resulting paraffin dispersion, while at a temperature above that of the melting point of the paraffin, is suddenly chilled, as the fine particles of paraffin have a tendency to agglomerate and coalesce while in the liquid state, if allowed to cool slowly. The resulting dispersion is, as in the case of the asphalt dispersion, an excellent waterproofing composition for felts, papers, yarns, textiles, fabrics, or the like. It is adapted for use on the calender rolls of a paper machine, to impart a high gloss or finish to the paper, under which conditions it may be used at very low concentration and maintain its stability. It is also suitable for the sizing of paper pulp in the beater engine and for the so-called tub-sizing of paper to render it waterproof and to impart thereto the appearance and characteristics of waxed papers produced by dipping in molten paraffin. In sizing papers after they have been formed by passing through a bath of the paraffin dispersion, the paper may be either in waterleaf condition or in partially sized condition, in which latter case when passed through the paraffin wax dispersion too great an absorption of paraffin wax will not take place.

In preparing dispersions of the type hereinbefore described, one should determine in the case of each particular dispersion the maximum dispersed solids concentration at which the dispersion is free-flowing and dilutable with water when the proper small amount of alkali is used in solution for saponifying the readily saponifiable portion of the Montan wax. It is also necessary to use a sufficient amount of Montan wax to furnish sufficient saponifiable constituent to result in a stable dispersion, but in the case of both the paraffins and asphalts, only about 10% to 15% of crude Montan wax is necessary for this purpose, although it may be necessary to use as high as 20% to 25% of the refined Montan wax. In the case of the paraffin dispersions made with such an amount of alkali to ensure no solidifying tendencies, the solids content should not be above 50% to 60%, and in the case of the asphalts of a melting point of about 150° F., not above 30% to 40% solids content for the best results. If these solids contents are exceeded, the normal condition of the dispersion will be solid and diluting water may be incorporated therein only with great difficulty and with the expenditure of considerable energy. The proportions of the various materials, as stated herein, are by way of example only, variations being contemplated therein, within the principles stated above.

The strength of the caustic soda solution used in preparing dispersions of paraffin and Montan wax of about 50% to 60% dispersed solids content and comprising 85 parts by weight of paraffin and 15 parts of crude Montan wax should not be above about ½%, or below about ¼%, at which lower limit of alkalinity the resulting dispersions would be unstable upon dilution with water, and dispersed solids would flocculate or separate out. On the other hand, the strength of the caustic soda solution may be as high as 1% in the case of dispersions of asphalt and Montan wax of about 35% to 40% solids content and comprising 85 parts by weight of asphalt and 15 parts of Montan wax. These strengths of caustic soda solution should be the same when refined Montan wax is used in lieu of the crude wax, but, as previously stated, the proportion of Montan wax relative to the other thermoplastic material must be increased in order to produce a stable product. The strength of the caustic soda solution may be increased somewhat, to produce satisfactory dispersions, if the solution is used in sufficiently greater proportion than those given, but, inasmuch as this expedient leads to dispersions of lower than maximum solids contents, it is generally undesirable.

I claim:

1. An alkaline aqueous dispersion whose solids content consists substantially of Montan wax, a normally solid asphalt, and the saponification products resulting from the reaction of an alkali with a portion of the saponifiable content of the wax, said dispersion being of sufficiently low alkalinity to be free-flowing and being substantially free from stabilizing agents other than said saponification products.

2. An alkaline aqueous dispersion whose solids content consists substantially of a relatively small amount of Montan wax, a large amount of a normally solid asphalt, and the saponification products of a portion of the saponifiable content of the wax, said dispersion being of sufficiently low alkalinity to be free-flowing and being substantially free from stabilizing agents other than said saponification products.

3. A process which comprises intimately mixing a molten mixture of Montan wax and asphalt with a solution of a non-stabilizing alkali, of less than 1% concentration, to produce a free-flowing dispersion of the unsaponified constituents of the molten mixture in the aqueous medium.

4. A process which comprises intimately mixing a solution of caustic soda of less than about 2% strength with a molten mixture of a comparatively small amount of Montan wax and a large amount of a normally solid asphalt to saponify a portion of the saponifiable content of the wax and to effect a dispersion of the unsaponified constituents of the molten mixture in the aqueous medium containing said saponified products as substantially the only stabilizing agents of the dispersion.

5. A dispersion of a mixture consisting of asphalt, Montan wax and a stabilizing agent supported in an aqueous medium, said stabilizing agent consisting of saponified products of said Montan wax.

6. A dispersion of particles comprising a mixture of asphalt and Montan wax supported in an aqueous alkaline medium and embodying reaction products produced by the action of said alkali on said Montan wax, said reaction products constituting substantially the only stabilizing agents of the dispersion.

7. A dispersion consisting of asphalt and reaction products resulting from the reaction of an alkali, such as caustic soda, with molten Montan wax as the stabilizing agent of a dispersion embodying dispersed particles of said asphalt supported in an aqueous medium.

8. The process of forming a dispersion of asphalt particles supported in an aqueous medium comprising melting and mixing together asphalt with a smaller quantity of Montan wax to form the melt and saponifying a portion of the saponifiable material in said wax for stabilizing said dispersion substantially only with said saponification products by dispersing said melt in an alkaline aqueous solution of less than 1% concentration while maintaining the melt and solution in a state of agitation and at an elevated temperature.

9. A dispersion comprising a mixture of not less than 90% of asphalt and not over 10% of crude Montan wax supported in an alkaline aqueous medium, the stabilizing agent of said dispersion consisting of saponified products of said Montan wax.

OSCAR F. NEITZKE.